United States Patent [19]

Lampinen

[11] Patent Number: 4,837,156
[45] Date of Patent: Jun. 6, 1989

[54] TILTING LAUTER TUN

[76] Inventor: Leo K. Lampinen, 172 Paddock Cr., Mississauga, Ont., Canada, L5L 3E4

[21] Appl. No.: 944,024

[22] Filed: Dec. 22, 1986

[51] Int. Cl.⁴ .............................................. C12C 1/00
[52] U.S. Cl. .................................... 435/302; 435/303; 435/305; 435/308; 435/316; 99/277.2
[58] Field of Search ............... 435/302, 303, 305, 306, 435/307, 308, 312, 316; 99/276, 277, 277.1, 277.2

[56] References Cited

U.S. PATENT DOCUMENTS

| | | | |
|---|---|---|---|
| 283,494 | 8/1883 | Kropff | 435/302 |
| 3,265,589 | 8/1966 | Steel | 435/316 |
| 4,264,741 | 4/1981 | Friedman et al. | 435/303 |
| 4,505,941 | 3/1985 | Raines | 99/277.1 |

Primary Examiner—Samuel Scott
Assistant Examiner—Noah Kamen
Attorney, Agent, or Firm—Rogers, Bereskin & Parr

[57] ABSTRACT

A vessel has a central longitudinal axis, a pair of trunnions defining a tilting axis, and a fixed bottom and a false bottom. The false bottom comprises at least one screen. At least one of the screens is affixed to the vessel by a plurality of hinges so as to allow the screens to freely swing from a first position to a second position as said vessel is tilted about the tilting axis.

15 Claims, 2 Drawing Sheets

TILTING LAUTER TUN

FIELD OF THE INVENTION

This invention relates to the field of tilting process vessels and, more particularly, it relates to a combined mash and lauter tun which is designed to tilt about a tilting axis.

BACKGROUND OF THE INVENTION

In a conventional brewhouse, ground malt is slurried with hot water in a mash mixer vessel which is equipped with a slow speed mixer. After a heating and hold cycle, the starches in the mash are coverted into fermentable sugars by an enzyme reaction. The converted mash is then pumped or dropped into a lauter tun which is a larger diameter vessel having a false bottom. This false bottom retains the spend grains on top of it while the wort, (extract of malt and possibly containing some cooked cereals as well) lauters (filters) through the false bottom and is collected for further processing. In addition, underdough collects under the lautering screen and must be removed by manual or automatic flushing with water. The spend grains (malt husks) are removed by automatic rakes that plow the spend grains to openings through which these spend grains fall for removal for drying or disposal as animal feed. Other devices such as wort filters are used to achieve this separation.

These are also combination mash-lauter tuns in use that combine the mashing and lautering in one vessel. However, for the small micro-breweries, it is not economical to construct the conventional lauter tun or combination mash-lauter tun because of the high cost of the equipment required to make these vessels functional.

BRIEF SUMMARY OF THE INVENTION

The present invention provides a vessel having a central longitudinal axis, a pair trunnions defining a tilting axis, and a fixed bottom and a false bottom. The false bottom comprises at least one screen. Said at least one screen has one or more hinges affixing the screen to the vessel so as to allow the screen to swing from a first position to a second, open position as the vessel is tilted about a tilting axis.

BRIEF DESCRIPTION OF THE DRAWINGS

The invention will be better understood with reference to the accompanying drawings which shows a preferred embodiment of the present invention and in which.

DESCRIPTION OF THE PREFERRED EMBODIMENT

Figure 1:
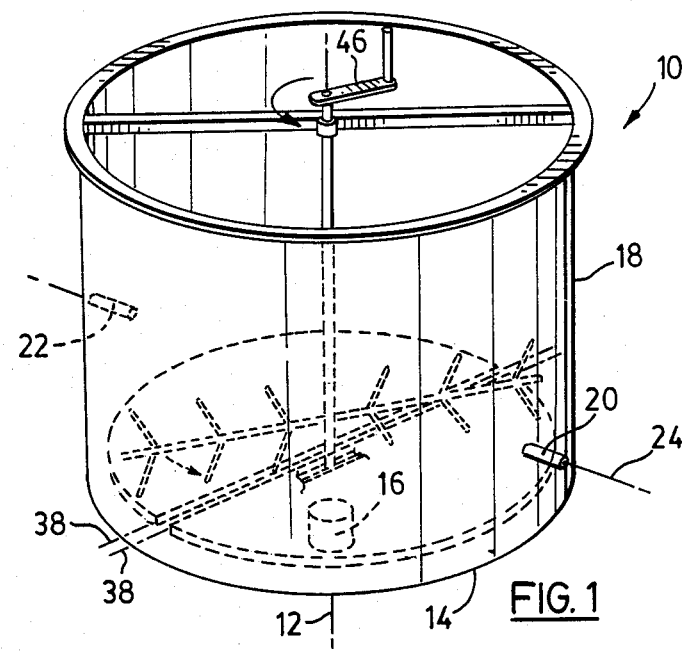
FIG. 1 is a perspective of the interior of a vessel according to the invention.
Figure 2:
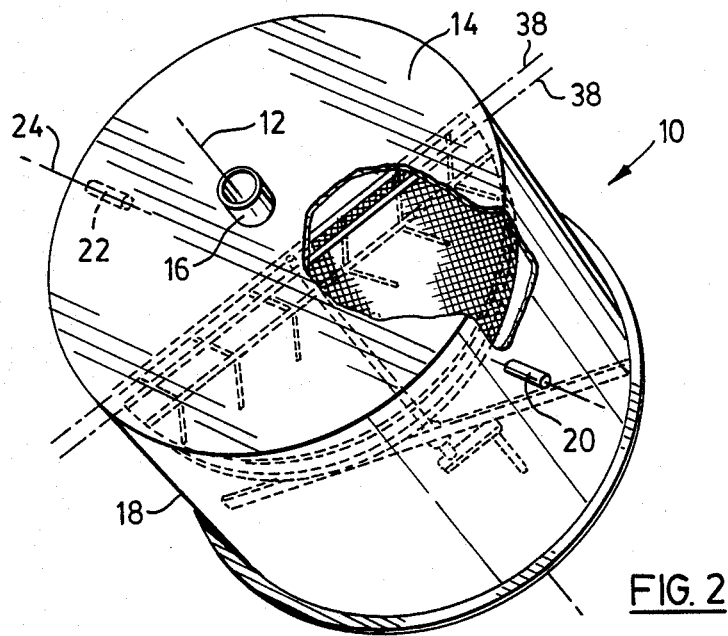
FIG. 2 is a perspective view from above of the vessel of FIG. 1 after it has been rotated through an angle of about 135°.

As shown in FIGS. 1 and 2, a vessel 10 has a central longitudinal axis 12, a fixed bottom 14, a drain 16 and a cylindrical side wall 18.

Drain 16 is connected to a run out hose (not shown) and may be located at the centre of fixed bottom 14.

The vessel 10 is supported on a pair trunnings 20, 22, Trunnions 20, 22 are located in an opposed manner on cylindrical side wall 18 and define tilting axis 24. Preferably, the trunnions are located so that tilting axis 24 intersects the center of gravity of vessel 10. Most preferably, trunnions 20, 22 are also located so that tilting axis 24 is perpendicular to and intersects central longitudinal axis 12. In this way, when vessel 10 is tilted, no weight will have to be lifted since vessel 10 will merely rotate substantially about its central of gravity. This results in two advantages. First, the energy required to tilt vessel 10 about tilting axis 24 will be minimized. Secondly, vessel 10 will smoothly rotate about tilting axis 24, thus reducing the wear of the trunnions and of the means used to tilt vessel 10.

Trunnions 20 and 22 are connected to a motor or any other convertional means (not shown), which may be used to tilt vessel 10 about tilting axis 24. For reasons to be discussed later, it is preferred that vessel 10 is tilted at least 90° and most preferably about 135° about tilting axis 24.

Figure 3:
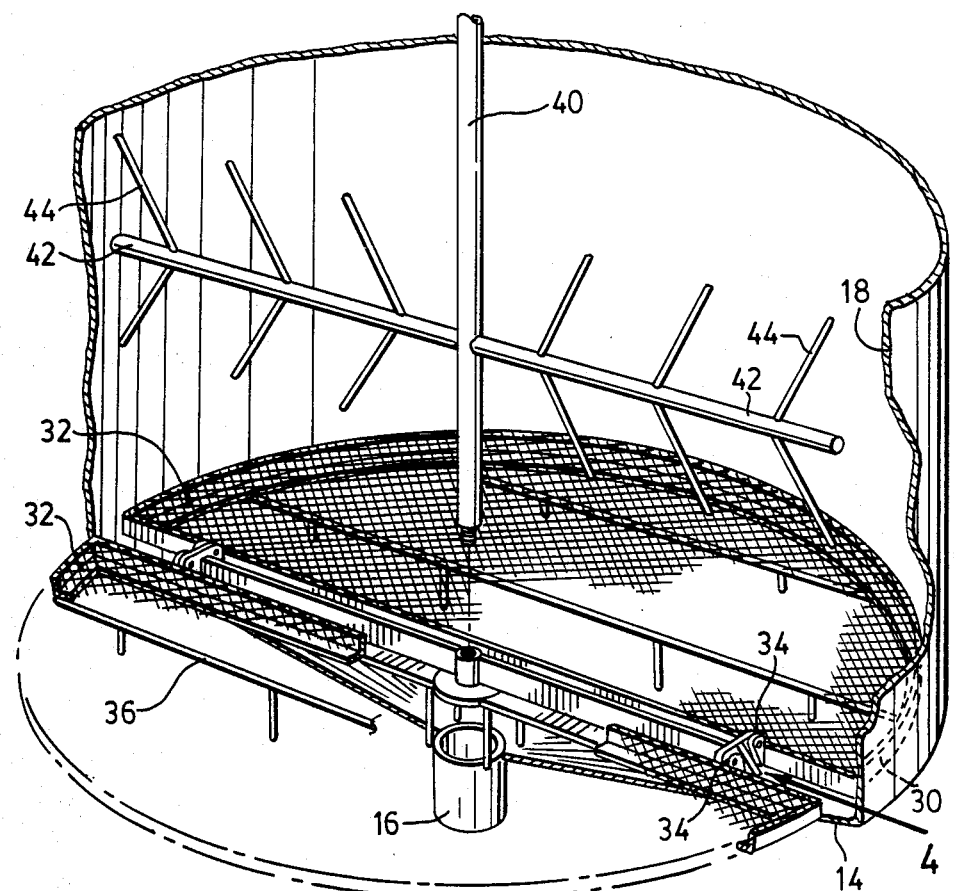
FIG. 3 is a cut away view of the vessel of FIG. 1.
Figure 4:
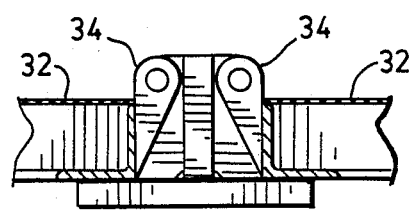
FIG. 4 is a enlargement of the area indicated in FIG. 3.

As shown in FIG. 3, a false bottom 30 is located adjacent fixed bottom 14. False bottom 30 comprises one or more screens 32. Preferably, false bottom 30 comprises two screens 32 and most preferably, the two screens 32 are located adjacent central longitudinal axis 12. Screens 32 may be made from expanded metal. Each screen 32 is pivotably attached to vessel 10 by a one or more hinges 34 so as to allow screens 32 to pivot from a first position adjacent fixed bottom 14, as shown in FIG. 3, to a second, open position adjacent central longitudinal axis 12 as shown in FIG. 2. When screens 32 are in the first position, they are supported over fixed bottom 14 by any conventional means such as screen supports 39. When screen 32 are in the second position, the screens are oriented so that they are substantially parallel. In this way, substantially all of fixed bottom 14 is exposed for cleaning.

As shown in FIGS. 1 and 2, each hinge 34 defines a pivotal axis 38. Depending upon the size of screens 32, pivotal axes 38 may lie in a plane that is perpendicular to central longitudinal axis 12. This ensures that screens 32 can freely swing to the second position. If screens 32 are substantially equal in size to fixed bottom 14, then unless pivotal axes 38 lie in a plane that is substantially perpendicular to central longitudinal axis 12, screens 32 may contact cylindrical side wall 18 when vessel 10 is tilted about tilting axis 24.

It is preferred that each pivotal axis 38 be oriented so that it is not parallel to tilting axis 24 and it is most preferred that each pivotal axis 38 is perpendicular to tilting axis 24. If pivotal about tilting axis 24, screens 32 will only fall partially to the second position shown in FIG. 2. However, if pivotal axes 38 are perpendicular to tilting axis 24, then screens 32 will fall completely to the second position when vessel 10 is tilted.

Vessel 10 also comprises a rake 40. Rake 40 is supported centrally within vessel 10. Rake 40 may be of any particular design which can used both as a mashing device and as a stirring device. Preferably, as shown in FIG. 3, rake 40 comprises a radially extending arm 42 and a plurality of tines 44. Tines 44 extend outwardly from arm 42 and define a plane which is substantially perpendicular to false bottom 30. In this way, when rake 40 is aligned so that arm 42 is parrallel with pivotable axes 38, and vessel 10 is tilted about tilting axis 24, screens 32 may pivot from the first position to the second open position without contacting rake 40.

Rake 40 is supported on bearings (not shown) so as to allow rake 40 to rotate within vessel 10. Rake 40 is also provided with a connector 46. As shown in FIG. 1, connector 46 may be located adjacent the upper end of rake 40. Connector 46 is attached to any conventional rotational means which may be used impart rotational movement to rake 40. In the preferred embodiment, vessel 10 has an open top. However, if it is desired to provide vessel 10 with a lid, then the lid could be provided with any suitable bearing means that would allow rake 40 to rotate within vessel 10.

In operstion, ground malt is introduced into vessel 10 which contains hot water. Rake 40 is used to stir and mash the malt. The mash is then held at the desired temperature and stirred as required until the starches are converted to sugars. Once the starches have been converted to fermentable sugars, the malt extract is removed from the vessel through drain 16. Sparge water is added to leach out the sugars from the spent grains. Drains 16 is disconnected from the run out hose and rake 40 is positioned so that it is parallel to pivotal axes 38. Vessel 10 is now ready to be tilted about tilting axis 24.

It is important that vessel 10 is tilted at least 90° about tilting axis 24. Once vessel 10 has been tilted 90°, the spent grains commence to fall out of vessel 10 into receiving containers. As vessel 10 is pivoted past the 90° point, gravity causes screens 32 to pivot from the first positon to the second position. Once vessel 10 has been tilted through an angle of 135°, screens 32 have pivoted completely to the second position. When the screens are in the second position, they are substantially parallel to each other. thus, fixed bottom 14 of vessel 10, as well as the undersides of screens 32, are exposed. At this point, a hose any other high pressure system may be used to clean fixed bottom 14 and the underside of screens 32.

If rake 40 is not substantially planar, then screens 32 and rake 40 should be complimentary so that rake 40 does not contact screens 32 when screens 32 rotate from the first position to the second position.

We claim:

1. A vessel having a lower portion, a central longitudinal axis, a pair of trunnions, and a fixed bottom and a false bottom, one of said trunnions is connected to the exterior of said vessel and the other of said trunnions is connected to the exterior of said vessel at the position opposite to said one of said trunnions so as define a tilting axis, said false bottom comprising at least two screens, each of said screens having one or more hinges, each of said hinges defining a pivotal axis, all of said pivoted axis are parallel and are located in a plane that is orthoganal to said central longitudinal axis, said hinges affixing said screens to said vessel to allow said screens to freely swing about said hinges from a first position in which said screens are positioned above said fixed bottom to a second position, in which said fixed bottom is exposed when said vessel is tilted about said tilting axis.

2. A vessel as claimed in claim 1 wherein said hinges are located adjacent said central longitudinal axis.

3. A vessel as claimed in claim 2 wherein said tilting axis passes through the lower portion of said vessel.

4. A vessel as claimed in claim 3 wherein said tilting axis intersects said central longitudinal axis.

5. A vessel as claimed in claim 4 wherein said tilting axis is perpendicular to said central longitudinal axis.

6. A vessel as claimed in claim 5 wherein said tilting axis intersects the center of gravity of said vessel.

7. A vessel as calimed in claim 6 wherein all of said pivotal axes are perpendicular to said tilting axis.

8. A vessel as claimed in claim 7 wherein said vessel may be tilted at least 90° about said tilting axis.

9. A vessel as claimed in claim 8 wherein said vessel may be tilted approximated 135° about said tilting axis.

10. A vessel as claimed in claim 9 wherin the vessel has bearing means adjacent the top of said vessel and a rake located centrally in said vessel, said rake comprising a rake portion and an upright member, said member extending from said rake portion substantially vertically to said bearing means.

11. A vessel as claimed in claim 10 wherein said rake portion comprises a radially extending arm and a plurality of tines extending outwardly from said radially extending arm.

12. A vessel as claimed in claim 11 wherein said rake is plannar

13. A vessel as claimed in claim 1 wherein said vessel has bearing means adjacent to the top of said vessel and a rake located centrally in said vessel, said rake comprising a rake portion and an upright member, said member extending from said rake portion substantially verically to said bearing means.

14. A vessel as claimed in claim 13 wherein said rake portion comprises a radially extending arm and a plurality of tines extending outwardly from said radially extending arm.

15. A vessel as claimed in claim 14, wherein said rake is planar

* * * * *